United States Patent [19]
Doi et al.

[11] Patent Number: 4,955,061
[45] Date of Patent: Sep. 4, 1990

[54] METHOD AND APPARATUS FOR PROCESSING AN IMAGE SIGNAL

[75] Inventors: Tetsuo Doi, Kanagawa; Takeshi Funabashi, Saitama, both of Japan

[73] Assignee: Sony Corporation, Tokyo, Japan

[21] Appl. No.: 281,904

[22] Filed: Dec. 6, 1988

Related U.S. Application Data

[63] Continuation of Ser. No. 856,456, Apr. 25, 1986, abandoned.

[30] Foreign Application Priority Data

Apr. 27, 1985 [JP] Japan ................................. 60-091382
Apr. 30, 1985 [JP] Japan ................................. 60-092919
Apr. 30, 1985 [JP] Japan ................................. 60-092920

[51] Int. Cl.⁵ .............................................. G06K 9/00
[52] U.S. Cl. .................................... 382/56; 358/261.1; 358/486
[58] Field of Search ................ 382/56; 358/426, 261.1, 358/486

[56] References Cited

U.S. PATENT DOCUMENTS

| | | | |
|---|---|---|---|
| 3,670,099 | 6/1972 | Oliver | 358/288 |
| 3,912,861 | 10/1975 | Vandling | 358/288 |
| 3,916,095 | 10/1975 | Weber et al. | 178/6 |
| 4,092,676 | 5/1978 | Saran | 358/261 |
| 4,107,648 | 8/1978 | Frank | 382/56 |
| 4,228,469 | 10/1980 | Ford | 358/288 |
| 4,311,989 | 1/1982 | Roux | 340/347 DD |
| 4,376,933 | 3/1983 | Saran et al. | 340/347 DD |
| 4,486,784 | 12/1984 | Abraham | 358/261 |
| 4,500,926 | 2/1985 | Yoshimaru | 358/256 |
| 4,568,983 | 2/1986 | Bobick | 358/260 |
| 4,571,634 | 2/1986 | Caneschi | 358/261 |
| 4,597,016 | 6/1986 | Nakamura | 358/261 |
| 4,628,368 | 12/1986 | Kurata et al. | 358/293 |
| 4,716,467 | 12/1987 | Menon | 356/260 |
| 4,733,308 | 3/1988 | Nakamura | 358/260 |

FOREIGN PATENT DOCUMENTS 83301404.6 3/1985 European Pat. Off. .
58-3473 6/1981 Japan .
58-175270 3/1983 Japan .
2148071A 5/1985 United Kingdom .

Primary Examiner—Leo H. Boudreau
Attorney, Agent, or Firm—Philip M. Shaw, Jr.

[57] ABSTRACT

An apparatus for compressed encoding or decoding of a binary image signal and outputting the same wherein both the encoder and the decoder employ counters which are caused to run at a faster than normal rate when certain predetermined conditions relative to the processed data are detected.

5 Claims, 6 Drawing Sheets

METHOD AND APPARATUS FOR PROCESSING AN IMAGE SIGNAL

This is a continuation of co-pending application Ser. No. 856,456 filed on Apr. 25, 1986, now abandoned.

BACKGROUND OF THE INVENTION

1. Field of the Invention

The present invention relates to an apparatus for processing an image signal which is used to encode and/or decode a binary image signal.

2. Description of the Prior Art

According to a conventionally known apparatus for processing an image signal, an image such as a document, diagram, or the like is scanned and read by an image scanner to obtain an image signal. This image signal is binarized and further converted into a highly efficient compressed code data by way of a two-dimensional encoding system using, for example, the correlation between adjacent lines. This compressed code data is then transmitted or stored.

Such a conventional image signal processing apparatus needs a circuit for compression encoding the binary image signal and a circuit for decoding the compression encoded image signal into the binary image signal, respectively.

In the case where the two-dimensional encoding system is used, during encoding and decoding the reference line information, namely, the position information at the transition (i.e., change) positions where the value of the binary data in the preceding adjacent line changes from black to white or from white to black must be encoded and decoded. This is a great amount of information and, therefore, line memories, each having a capacity large enough so that all of the binary image data of at least one of the reference lines can be stored, are needed for the encoding circuit and decoding circuit, respectively. Thus, the circuit scale and cost extremely increase as the complexity and detail of the image increase.

There is also the problem that it takes a long processing time period for the step of detecting the position information of the transition positions from the binary image data written in the line memory.

Hitherto, in the encoding, the information indicative of the position of the transition pixel having a value different from the value of the pixel just before the transition pixel of the binary signal, namely, the address of the transition position, is detected by checking the pixels dot by dot to see if the pixel's value changes from white to black or from black to white or not.

However, to check the pixels dot by dot, if it is assumed that the time period of, e.g., 100 nsec is needed to check one dot, takes 0.8 second to check the transition position of the image data of one screen which consists of, e.g., one mega bytes. Consequently, if the processing time period for encoding after the detection of the transition is included, a few seconds are required to encode the image signal of one screen.

Furthermore, in the case of reproducing the image by decoding the binary image signal from the signal encoded as described above, the run length of the decoded line is calculated on the basis of the code word while using the information of the reference line. The binary image signal is generated on the basis of the run length calculated and the image is reproduced.

According to the conventional image signal processing apparatus, the circuit to generate the binary image signal based on the run length is constituted by a counter of, e.g., twelve bits. The run length is set to the 12-bit counter and counted down in response to a clock pulse which is supplied to a clock terminal. When the value of the counter becomes 0, a transition signal indicative of the change from black to white or from white to black is generated in the binary image signal.

In such a construction, similarly to the encoding circuit, when it is assumed that a duration of one clock pulse is, e.g., 100 nsec, it takes the time period of 0.8 seconds to generate the binary signal if the image data of one screen consists of, e.g., one mega bytes. If the time period necessary for the decoding process is included, a few seconds are required to reproduce the image of one screen.

OBJECTS AND SUMMARY OF THE INVENTION

It is therefore an object of the present invention to provide an apparatus for processing an image signal which can solve the foregoing conventional problems.

Another object of the invention is to provide an apparatus for processing an image signal in which the circuit scale is reduced.

Another object of the invention is to provide an image signal processing apparatus in which the processing time is reduced by reducing the encoding and decoding times.

Still another object of the invention is to provide a cheap image signal processing apparatus.

Still another object of the invention is to provide an image signal processing apparatus in which at least parts of an encoding circuit and a decoding circuit are commonly used.

Still another object of the invention is to provide an image signal processing apparatus which can cope with the change of the encoding system without largely changing the hardware.

According to one aspect of the present invention, the above and other objects are achieved by an apparatus, and the method embodied therein, for processing an image signal comprising data input/output circuit means for receiving input image data or compressed code data and for outputting the compressed code data or output image data, encoding circuit means for encoding the input image data into the compressed code data, and decoding circuit means for decoding the compressed code data into the image data to be outputted.

Control means are provided for controlling the encoding circuit means and decoding circuit means, including memory means for storing a program for controlling the encoding circuit means and a program for controlling the decoding circuit means. Also provided is selecting means for selecting one of the programs so as to selectively effect encoding or decoding in the encoding circuit means or the decoding circuit means so that the data input/output circuit means selectively receives the input image data or outputs the output image data and selectively outputs the compressed code data or output image data.

According to another embodiment of the invention, there is provided an apparatus for processing an image signal comprising data input circuit means for receiving input image data having first and second binary values, encoding circuit means for encoding the input image data into compressed code data, and data output circuit means for outputting the compressed code data. The encoding circuit means includes (i) first detecting circuit means for detecting transition points where the value of the input image data changes from one to another of the first and second binary values, (ii) counter means for generating addresses of the transition points of the input image data, (iii) second detecting circuit means for detecting if the value of the input image data does not change during a time period exceeding a predetermined period, (iv) control means for controlling the counter means so as to count at a faster than normal speed to a predetermined number during each predetermined period, when the value of the input image data does not change during a period exceeding a predetermined period, and (v) encoder means for encoding the input image data by using the addresses of the transition points of the input image data.

According to still another aspect of the invention, there is provided an apparatus for processing an image signal comprising data input circuit means for receiving input image data, encoding circuit means for encoding the input image data into compressed code data by using the correlation between a preceding line as a reference line and an encoding line, and data output circuit means for outputting the compressed code data. The encoding circuit means includes (i) detecting circuit means for detecting transition points where the value of the input image data changes from one to another of the first and second binary values and for generating information data according to the transition points, (ii) first and second memory means for storing the information data, (iii) control means for controlling the first and the second memory means so that while one of the first and the second memory means is in a write status, the other is in a read status and the write and read statuses are alternately changed for every line, (iv) switching means for selectively connecting the data input circuit means to either of the first and second memory means, and (v) encoder means for reading out the information data according to the transition points of a preceding line from one of the first and second memory means and writing the information data according to the transition points of an encoding line into another of the first and second memory means.

According to still another aspect of the invention, there is provided an apparatus for processing an image signal comprising data input circuit means for receiving compressed code data, decoding circuit means for decoding the input compressed code data into output image data to be outputted, and data output circuit means for outputting output image data.

The decoding circuit means includes (i) counter means for presetting a run length of the input compressed code data, (ii) detecting circuit means for detecting if the run length of the input compressed code data exceeds a predetermined number, (iii) control means for controlling the counter means so as to count at a faster than normal speed when the run length of the input compressed code data exceeds a predetermined number, and (iv) decoder means for generating binary image data according to the run length preset in the counter means.

The above and other objects, features and advantages of the present invention will be more apparent from the following detailed description in conjunction with the accompanying drawings.

DESCRIPTION OF THE PREFERRED EMBODIMENTS

An embodiment of the present invention will now be described hereinbelow with reference to the drawings.

The two-dimensional encoding system using the correlation between the adjacent lines, for example, the MR (Modified Read) encoding system is used as the encoding system for use in an apparatus for processing an image signal according to the invention.

According to the MR encoding system, the encoding is executed in the following procedure.

Figure 1A:
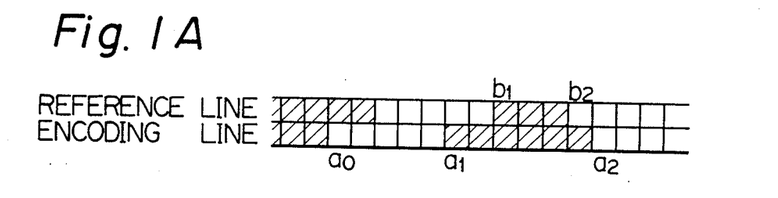
FIGS. 1A to 1C are schematic diagrams for explaining the encoding system for use in an apparatus for processing an image signal according to an embodiment of the present invention.
Figure 1B:
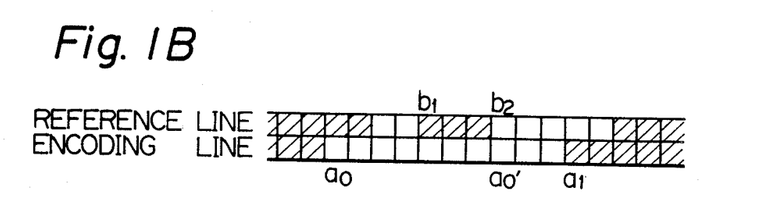
Figure 1C:
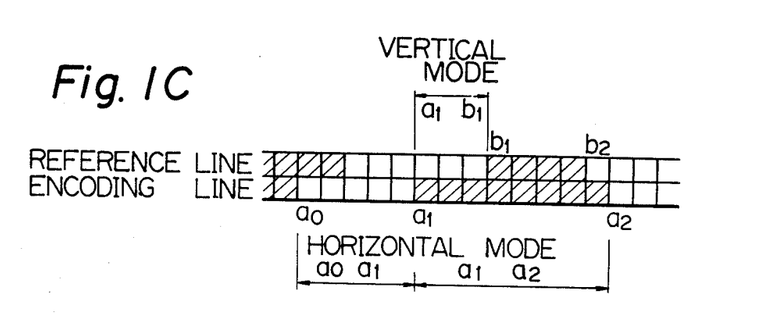

In FIGS. 1A to 1C, blank square portions denote white pixels and hatched square portions indicate black pixels. The starting pixel and transition pixel for encoding are defined as follows.

Starting pixel: The pixel of the encoding line which becomes the starting point for encoding and this pixel is indicated by $a_0$.

Transition pixel: The pixel just after the value changed from white to black or from black to white. The transition pixels on the encoding line are sequentially indicated by $a_1$ and $a_2$. The transition pixels on the reference line are represented by $b_1$ and $b_2$.

(Procedure 1)

The pass mode is first detected. The pass mode denotes the case (merge) where the white or black portions ($b_1$ to $b_2$) which appeared in the reference line disappear in the encoding line as shown in FIG. 1B. When the pass mode is detected, the pass mode "0001" is generated. The starting pixel $a_0$ is shifted to $a_0'$ just under $b_2$ (FIG. 1B).

(Procedure 2)

In the case where the mode is not the pass mode, a check is made to see if the absolute value of $|a_1 b_1|$ is larger than three or not, thereby determining whether the encoding is carried out in the horizontal mode or vertical mode. If $|a_1 b_1| > 3$, the encoding is performed in the horizontal and if $|a_1 b_1| \leq 3$, the encoding is executed in the vertical mode (FIG. 1C).

In the horizontal mode, the encoding is performed in the case (new start) where there is a weak correlation between the encoding line and the reference line and white or black is newly generated on the encoding line. In the horizontal mode, the distances $a_0 a_1$ and $a_1 a_2$ are encoded using the MH (Modified Huffman) code subsequent to "001" indicative of the horizontal mode. At the same time, the starting pixel is shifted to $a_2$.

In the vertical mode, the encoding is performed in the case where there is strong correlation between the encoding line and the reference line and it is performed on the basis of the following table. At the same time, the starting pixel is shifted to $a_1$.

| Encoding mode | Encoding pixel | | Symbol | Code word |
|---|---|---|---|---|
| Pass mode | $(b_1 b_2)$ | | P | 0001 |
| Horizontal mode | $a_0 a_1, a_1 a_2$ | | H | 001 + $M(a_0 a_1)$ + $M(a_1 a_2)$ |
| Vertical mode | $\Delta = 0$ | $a_1 b_1 = 1$ | V(0) | 1 |
| | $\Delta > 0$ | $a_1 b_1 = 1$ | $V_R(1)$ | 011 |
| | | $a_1 b_1 = 2$ | $V_R(2)$ | 000011 |
| | | $a_1 b_1 = 3$ | $V_R(3)$ | 0000011 |
| | $\Delta > 0$ | $a_1 b_1 = 1$ | $V_L(1)$ | 010 |
| | | $a_1 b_1 = 2$ | $V_L(2)$ | 000010 |
| | | $a_1 b_1 = 3$ | $V_L(3)$ | 0000010 |

The process in the case of encoding a binary image signal will now be described.

Figure 2:
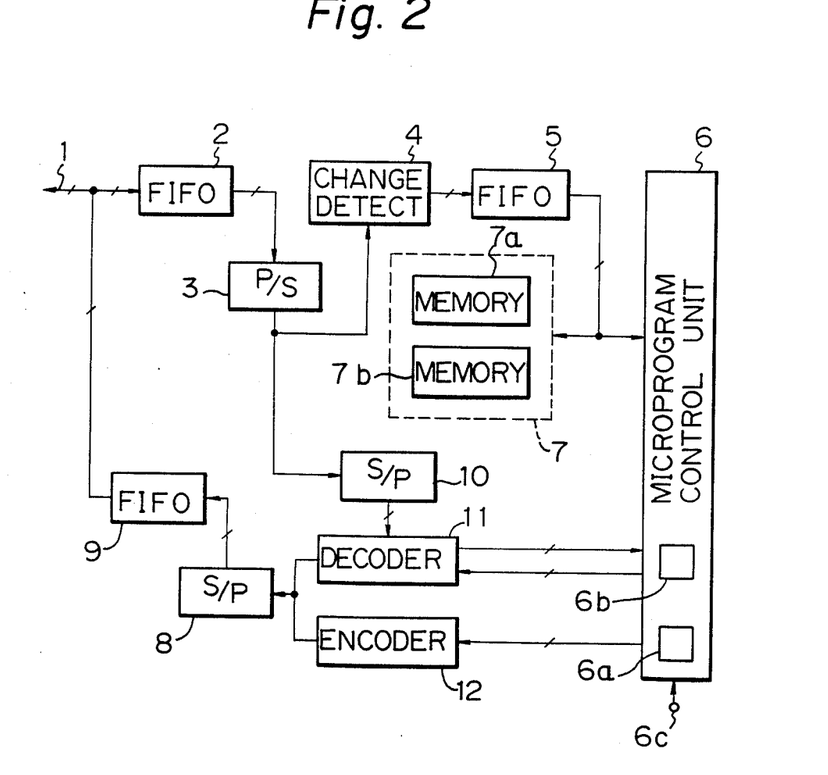
FIG. 2 is a block diagram showing an image signal processing apparatus according to an embodiment of the invention.

FIG. 2 shows a block diagram of an image signal processing apparatus in which at least parts of encoding circuit and decoding circuit are commonly used. The image such as document, diagram, or the like which was read by an image scanner (not shown) is converted into binary values representative of black and white to obtain a binary image signal. This binary image signal is transferred as input data through an input/output (I/0) data bus 1. The image data encoded by the foregoing two-dimensional encoding system is also transferred as output data through the I/0 data bus 1.

In the case of decoding, the encoded image data is transferred as input data through the I/0 data bus 1 and the binary image signal is transferred as output data through I/0 data bus 1 in a manner opposite to the case of encoding.

The binary image signal transferred through the I/0 data bus 1 is transferred as 16-bit parallel data. Namely, the binary image signal of the pixels, which are continuously arranged, is divided for every sixteen pixels, for instance. The binary image signals each consisting of sixteen pixels are arranged to form the 16-bit parallel data. This parallel data is transferred through the data bus 1 into a first-in first-out register (hereinafter, abbreviated as an FIFO) 2.

An output of the FIFO 2 is supplied to a parallel-to-serial (P/S) converting circuit 3, by which the input parallel data is converted into serial data. Thus, the binary image signal of each pixel is sequentially outputted from the P/S converter 3.

An output of the P/S converter 3 is supplied to a change (or transition) position detecting circuit 4, which will be explained in detail later. The detecting circuit 4 serves to obtain the transition position on the line where the value of the binary image signal of each pixel which is sequentially outputted changes from black to white or from white to black.

The transition position information on the line obtained is set to, e.g., 12-bit parallel data and supplied through a FIFO 5 to a microprogram control unit (hereinafter, abbreviated as an MPU) 6 and to a memory circuit 7.

The memory circuit 7 is constituted by two memories 7a and 7b as will be explained in detail hereinbelow. Read and write statuses of the memories 7a and 7b are alternately switched for every line. Namely, the transition position information of the preceding line is stored in one memory. When this memory has the read status, the other memory has the write status, so that the transition position information on the current line is written into the other memory. The transition position information of the preceding line necessary for the MR encoding is obtained from one memory having the read status of the memory circuit 7. This position information is supplied to the MPU 6. The transition position information of the current line necessary for the MR encoding is supplied from the FIFO 5 to the MPU 6.

The encoding mode and the white run length and black run length which are necessary for encoding are calculated by the MPU 6 on the basis of the transition position information of the current line and of the preceding line. The calculated data is the parallel data of, e.g., twelve bits and is supplied from the MPU 6 to an encoding circuit 12.

The encoding circuit 12 is constituted by, e.g., a ROM and the code word based on the MR code corresponding to the calculated data which is supplied from the MPU 6 is preliminarily written into a table. The calculated data from the MPU 6 is converted into the code word by the encoding circuit 12 due to the MR encoding system. This code word is outputted as serial data from the encoding circuit 12.

An output of the encoding circuit 12 is supplied to a serial-to-parallel (S/P) converting circuit 8, by which the serial data is converted into parallel data of, e.g., sixteen bits. This encoded data is inputted into a FIFO 9 and transferred from the FIFO 9 through the I/0 data bus 1.

The process in the case of decoding will now be described. The image data encoded by the MR encoding system is set to 16-bit parallel data and supplied into the FIFO 2 through the data bus 1. The output of the FIFO 2 is supplied to the P/S converter 3.

The 16-bit parallel data is converted into serial data by the P/S converter 3 and this serial data is supplied to a serial-to-parallel (S/P) converting circuit 10.

The S/P converter 10 is constituted by a shift register. The serial data supplied to the S/P converter 10 is converted to parallel data for every code word and supplied to a decoding circuit 11.

The decoding circuit 11 is constituted by a decoding ROM to discriminate the mode and obtain the run length from the MH code and a signal generating circuit to generate the binary image signal on the basis of the run length, which will be explained in detail later. The code word supplied to the decoding circuit 11 is inputted to the decoding ROM of the decoding circuit 11, by which the mode is discriminated.

The position information of the change points, i.e., the transition points of the reference line is written in one memory 7a or 7b constituting the memory circuit 7. When the pass mode is discriminated, the mode information is supplied from the decoding circuit 11 to the MPU 6. The new starting pixel $a_0'$ is set to the MPU 6 on the basis of the transition position information of the reference line which has been stored in the memory circuit 7.

When the horizontal mode is discriminated, the run length is obtained from the MH code in the decoding ROM. The binary image signal is generated from the signal generating circuit of the decoding circuit 11 on the basis of the run length. At the same time, the transition position information of the change points where the value of the binary image signal changes from white to black or from black to white is written into the other memory 7b or 7a of the memory circuit 7 through the MPU 6.

When the vertical mode is discriminated, the run length is calculated on the basis of the position information of the reference line which is read out from one memory 7a or 7b of the memory circuit 7. The binary image signal is generated from the signal generating circuit of the decoding circuit 11 on the basis of the run length. At the same time, the transition position information of the change points where the value of the binary image signal changes from white to black or from black to white is written into the other memory of the memory circuit 7 through the MPU 6.

The binary image signal generated from the signal generating circuit of the decoding circuit 11 is supplied to the S/P converter 8 and converted into 16-bit parallel data and then supplied to the FIFO 9. The binary image signal which is outputted from the FIFO 9 is transmitted through the data bus 1, so that the image is reproduced by the binary image signal.

Although the MR encoding system has been used as the encoding system in the above description, the M²R encoding system, which is the extended MR system, or other compression encoding system may also be used.

According to the above construction, the input/output buffers, memories to store the information of the reference line, and the like are commonly used in the encoding and decoding circuits, so that the overall circuit scale can be reduced and the apparatus can be cheaply constituted. On the other hand, the programs regarding the encoding and decoding are stored in microprogram memories 6a and 6b in the MPU 6, respectively. The encoding and decoding modes are switched by a control signal which is supplied to a control terminal 6c. Even when the encoding system or the like is changed as well, there is no need to remarkably change the hardware but it can be realized merely by changing the program.

Figure 3:
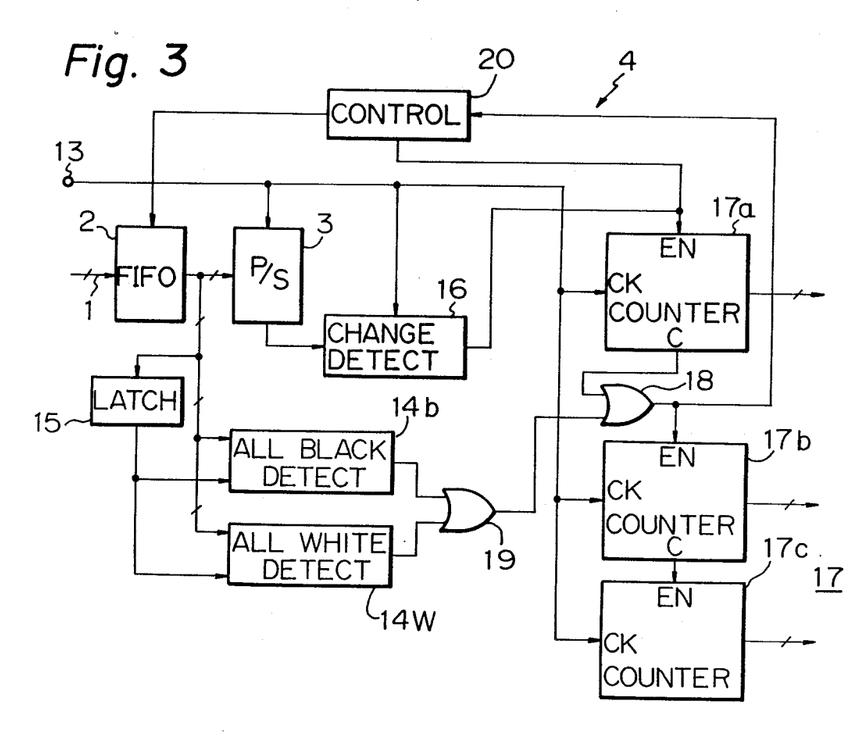
FIG. 3 is a block diagram showing a transition position detecting circuit in an embodiment of the image signal processing apparatus according to the invention.

The change detecting circuit 4 will now be further described in detail with reference to FIG. 3.

As mentioned above, the binary image signal transmitted through the I/0 bus 1 is supplied to the FIFO 2 on a block unit basis, in which one block consists of sixteen pixels. The output of the FIFO 2 is supplied to the P/S converter 3. A clock signal is supplied from a terminal 13 to the P/S converting circuit 3, by which the parallel data of the binary image signal is converted into the serial data. At the same time, the output of the FIFO 2 is supplied to an all black detecting circuit 14B and an all white detecting circuit 14W. The data of the LSB (least significant bits) corresponding to the sixteenth data with respect to the time sequence among the data of sixteen pixels from the FIFO 2 is latched into a latch circuit 15.

The all black detecting circuit 14B detects whether the output of the FIFO 2 including the last pixel data of the preceding block which has been latched in the latch circuit 15 is the data of all black pixels or not. The all white detecting circuit 14W detects whether the output of the FIFO 2 including the last pixel data of the preceding block which has been latched in the latch circuit 15 is the data of all white pixels or not.

The discrimination regarding whether the data is for all black pixels or for all white pixels in the all black detecting circuit 14B and all white detecting circuit 14W, respectively, is executed by detecting not only the data of the FIFO 2 but also the LSB of the output of the FIFO 2 of the preceding block which has been latched in the latch circuit 15. The reason for this double detection is to prevent malfunction in the case where the transition of the value of the binary image signal which is transmitted as the parallel data occurs between adjacent two data. Namely, there is the case where the transition occurs between the adjacent data and the value of the pixel of the LSB of the output data of the FIFO 2 of the preceding block differs from the value of the pixel of the MSB (most significant bit) of the output data of the FIFO 2 of the current block. Also the output data of the FIFO 2 of the current block is the data of all black or white pixels. In such a case, if the detection is made without including the pixel of the LSB of the FIFO 2 of the preceding block, the 12-bit counter will have been counted up by sixteen, so that the transition which occurs between the adjacent data cannot be detected.

The output of the P/S converter 3 is supplied to a change (or transition) detecting circuit 16. A clock signal is supplied from the terminal 13 to the change detecting circuit 16. The detecting circuit 16 detects the change, i.e., transition position where the value of the binary image signal as the serial data which is outputted from the P/S converter 3 changes from black to white or from white to black. An output of the change detecting circuit 16 is supplied as a count enable signal to a 4-bit counter 17a constituting a 12-bit counter 17. A carry output of the counter 17a is supplied as a count enable signal to a 4-bit counter 17b through an OR gate 18. A carry output of the counter 17b is supplied as a count enable signal to a 4-bit counter 17c. By cascade connecting the 4-bit counters 17a, 17b, and 17c in this manner, the 12-bit counter 17 is constituted as a whole.

A clock signal is supplied from the terminal 13 to the counters 17a, 17b, and 17c, so that the 12-bit counter is counted up one by one. When the transition is detected by the change detecting circuit 16, the counting operation of the counter 17a is stopped.

The outputs of the all black detecting circuit 14B and all white detecting circuit 14W are supplied to an OR gate 19. When the output data of the FIFO 2 including the output data of the latch circuit 15 is the data of all black pixels or all white pixels, a high level signal is outputted from the OR gate 19 and supplied as a count enable signal to the counter 17b through the OR gate 18. At the same time, the output of the OR gate 19 transmitted through the OR gate 18, is supplied to a control circuit 20, so that the counting operation of the counter 17a is stopped in response to an output of the control circuit 20. Consequently, the 12-bit counter 17 is counted up by sixteen at a time in response to one clock pulse. The output of the control circuit 20 is supplied to the FIFO 2 and the timing of the output of the FIFO 2 is controlled.

As described above, the counter 17 is counted up by sixteen at a time in response to one clock pulse when the values of the data of sixteen or more continuous pixels do not change and at the same time, when the output data of the FIFO 2 including the data of the LSB of the output of the FIFO 2 of the preceding block is the data of all black pixels or all white pixels. In the case where some of the values of the pixel data within sixteen continuous pixels change and both of the data of white pixels and the data of black pixels are included in the output of the FIFO 2, the counter 17 is counted up one by one in response to one clock pulse. At the same time, when the transition is detected by the change detecting circuit 16, the counting operation of the 12-bit counter 17 is stopped and the transition position on the line can be obtained from this value.

According to the above construction, for example, when the values of sixteen pixels of the binary image signal do not change, the 12-bit counter 17 constituted by, e.g., 4-bit counters 17a, 17b, and 17c is counted up by sixteen in response to one clock pulse. Thus, the transition position on the line can be detected at a high speed.

The memory circuit 7 in the embodiment will now be described in detail with reference to FIG. 4.

Figure 4:
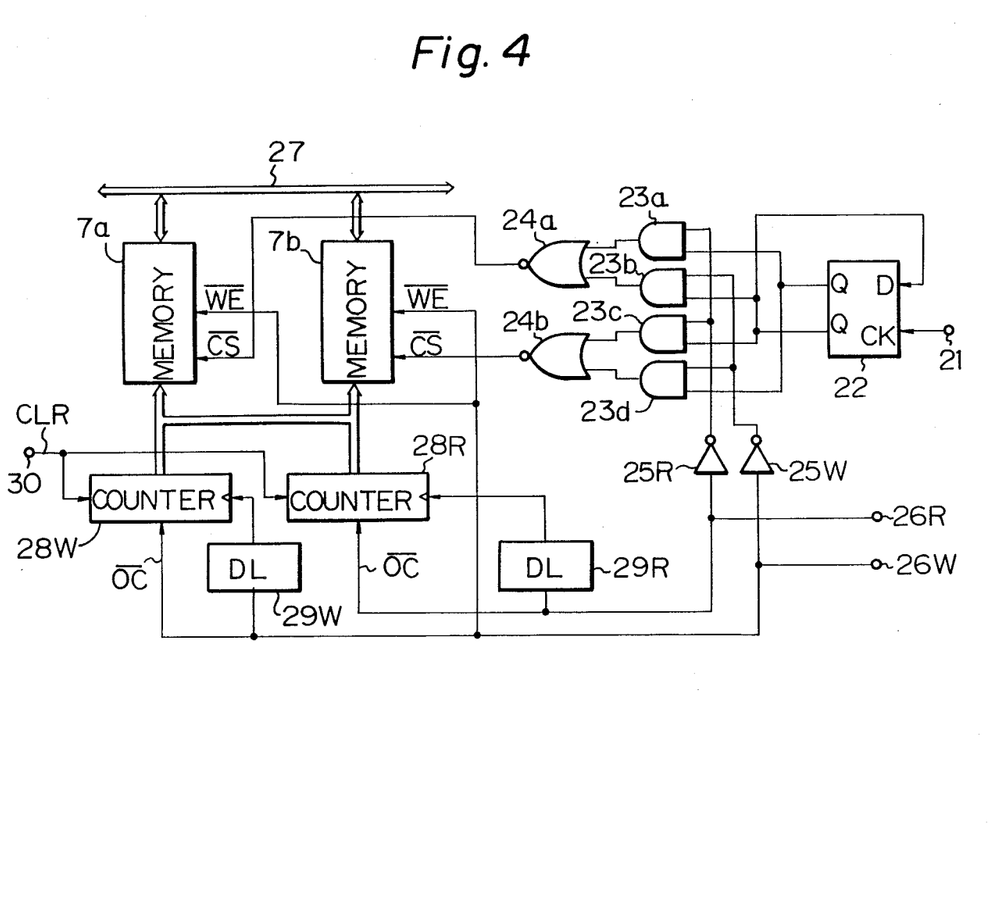
FIG. 4 is a block diagram showing a memory circuit in an embodiment of the image signal processing apparatus according to the invention.

In FIG. 4, a line pulse is supplied to a clock input terminal CK of a D-type flip-flop 22 from a terminal 21. An output Q of the flip-flop 22 is supplied to one input terminal of each of AND gates 23a and 23d and an output $\overline{Q}$ is supplied to one input terminal of AND gates 23b and 23c and to a data input terminal D of the flip-flop 22. A low-level read pulse is supplied from a terminal 26R through an inverter 25R to the other input terminals of the AND gates 23a and 23c. A low-level write pulse is supplied from a terminal 26W through an inverter 25W to the other input terminals of the AND gates 23b and 23d. The read pulse and write pulse which are supplied to the terminals 26R and 26W are generated from the MPU 6.

Outputs of the AND gates 23a and 23b are supplied to an NOR gate 24a. An output of the NOR gate 24a is supplied to a chip selection terminal $\overline{CS}$ of the memory 7a. Outputs of the AND gates 23c and 23d are supplied to an NOR gate 24b. An output of the NOR gate 24b is supplied to a chip selection terminal $\overline{CS}$ of the memory 7b. The write pulse is supplied to write enable terminals $\overline{WE}$ of the memories 7a and 7b from the terminal 26W, respectively.

The read status and write status of the memories 7a and 7b are switched for every line due to the D-type flip-flop 22, AND gates 23a to 23d, and NOR gates 24a and 24b. When the read pulse is supplied from the terminal 26R, the data of the reference line is read out from the memory having the read status. When the write pulse is supplied from the terminal 26W, on the other hand, the data is written into the other memory having the write status.

In other words, the output Q of the flip-flop 22 is supplied to one input terminal of each of the AND gates 23a and 23d. The output $\overline{Q}$ of the flip-flop 22 is supplied to an input terminal of each of the AND gates 23b and 23c. Assume now that the output Q is at a high level and the output $\overline{Q}$ is at a low level and that a high level signal is supplied to the terminals 26R and 26W while none of the read and write pulses is supplied. Thus, the low-level signal is supplied to the other input terminals of the AND gates 23a to 23d through the inverters 25R and 25W, so that all of the outputs of the AND gates 23a to 23d become a low level. Therefore, the outputs of the NOR gates 24a and 24b become a high level and the high level signal is supplied to the chip selection terminals $\overline{CS}$ of the memories 7a and 7b, respectively.

When the low-level read pulse is supplied from the terminal 26R, the high level signal is supplied to the other input terminals of the AND gates 23a and 23c through the inverter 25R. Since the output Q is at a high level and the output $\overline{Q}$ is at a low level, the output of the AND gate 23a becomes a high level and the outputs of the AND gates 23b to 23d become a low level. Therefore, the output of the NOR gate 24a becomes a low level and the output of the NOR gate 24b becomes a high level. Thus, low level signal is supplied to the chip selection terminal $\overline{CS}$ of the memory 7a and a high level signal is supplied to the chip selection terminal $\overline{CS}$ of the memory 7b.

When the low level write pulse is supplied from the terminal 26W, a high level signal is supplied to the other input terminals of the AND gates 23b and 23d through the inverter 25W. Since the output Q is at a high level and the output $\overline{Q}$ is at a low level, the output of the AND gate 23d becomes a high level and the outputs of the AND gates 23a to 23c become a low level. Therefore, a low level signal is supplied to the chip selection terminal $\overline{CS}$ of the memory 7b and a high level signal is supplied to the chip selection terminal $\overline{CS}$ of the memory 7a. At the same time, the low level write pulse is supplied from the terminal 26W to the write enable terminals $\overline{WE}$ of the memories 7a and 7b, respectively.

When a low level signal is supplied to the chip selection terminals $\overline{CS}$ of the memories 7a and 7b, they enter the read state. When a low level signal is supplied to the chip selection terminals CS and write enable terminals $\overline{WE}$ of the memories 7a and 7b, they enter the write state. Therefore, while the output Q is at a high level and the output $\overline{Q}$ is at a low level, when the low level read pulse is supplied to the terminal 26R, the memory 7a enters the read state. When the low level write pulse is supplied to the terminal 26W, the memory 7b enters the write state.

The output $\overline{Q}$ of the flip-flop 22 is supplied to the data input terminal D thereof. Thus, when the line pulse is supplied from the terminal 21, the levels of the outputs Q and $\overline{Q}$ are inverted. Therefore, in the next line, the output Q becomes a low level and the output $\overline{Q}$ becomes a high level. In this case, when the low level read pulse is supplied to the terminal 26R, the memory 7b becomes the read state. When the low level write pulse is supplied to the terminal 26W, the memory 7a becomes the write state. In this manner, the read and write statuses of the memories 7a and 7b are alternately switched for every line.

The read addresses for the memories 7a and 7b are produced by a counter 28R, while the write addresses are produced by a counter 28W. Namely, when the read pulse is supplied to the terminal 26R, an output control signal $\overline{OC}$ is supplied to the counter 28R. A count output of the counter 28R is supplied as an address signal to the memory having the read status between the memories 7a and 7b. At the same time, the read pulse is supplied to a clock input terminal of the counter 28R through a delay circuit 29R and the counter 28R is counted up. When the write pulse is supplied to the terminal 26W, the output control signal $\overline{OC}$ is supplied to the counter 28W. A count output of the counter 28W is supplied as an address signal to the other memory having the write status between the memories 7a and 7b. At the same time, the write pulse is supplied to a clock input terminal of the counter 28W through a delay circuit 29W and this counter is counted up.

The line pulse is supplied as a clear signal from a terminal 30. The counters 28R and 28W are cleared by the line pulse at the end of one line.

Figure 5:
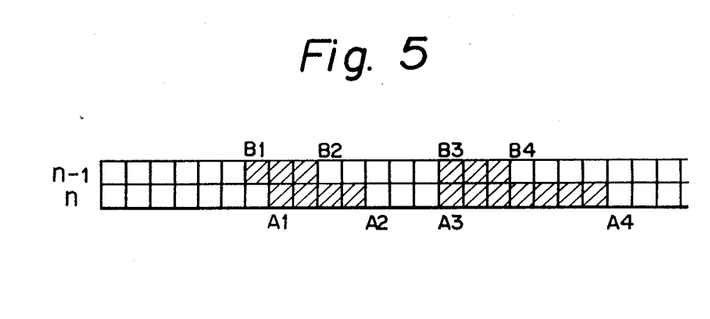
FIGS. 5, 6A, and 6B are schematic diagrams for explaining an embodiment of the image signal processing apparatus according to the invention.
Figure 6A:
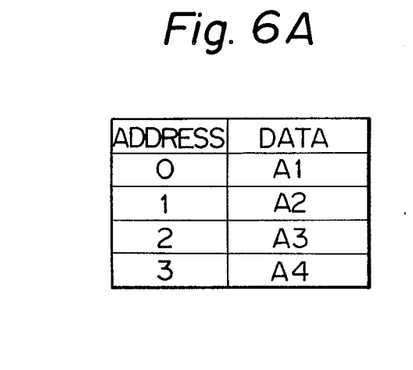
Figure 6B:
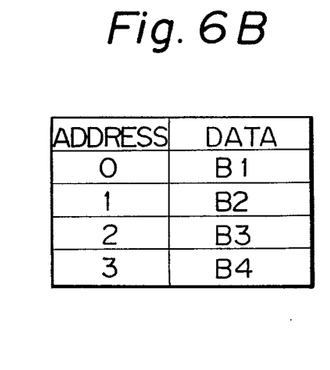

The memories 7a and 7b are bidirectionally connected to a data bus 27. The transition position information which is outputted from the FIFO 5 is transmitted through the data bus 27. For example, assume that the transition positions of the binary image data of the (n−1)th line are $B_1$, $B_2$, $B_3$, ----- as shown in FIG. 5, and that the memory 7a has the read status and the memory 7b has the write status. In this case, in the (n−1)th line, as shown in FIG. 6B, the transition position information $B_1$, $B_2$, $B_3$, ----- of the binary image data of the (n−1)th line which are outputted from the FIFO 5 are respectively written as the information of the reference line into addresses 0, 1, 2, 3, ----- in the memory 7b by the address signals which are generated from the counter 28W.

In the next nth line, the memory 7a becomes the write state and the memory 7b becomes the read state. As shown in FIG. 5, assume that the transition positions of the binary image data of the nth line are $A_1$, $A_2$, $A_3$, -----. In this case, as shown in FIG. 6A, the transition position information $A_1$, $A_2$, $A_3$, ----- of the binary image data of the nth line which are outputted from the FIFO 5 are respectively written as the information of the reference line corresponding to the next line into addresses 0, 1, 2, 3, ----- in the memory 7a by the address signals which are generated from the counter 28W. The transition position information $B_1$, $B_2$, $B_3$, ----- of the (n−1)th line which have been written in the memory 7b are sequentially read out by the address signals which are generated from the counter 28R. The transition position information of the reference line necessary for encoding or decoding the image data of the nth line is transferred to the MPU 6 through the data bus 27.

The transition position information is alternately written into the memories 7a and 7b for every line as the position information of the reference line for encoding or decoding the image data of the next line by the address signals which are generated from the counter 28W. The position information of the reference line to encode or decode the image data of the encoding line is read out by the address signals which are generated from the counter 28R According to the above construction, the read and write statuses of the memories 7a and 7b are alternately switched for every line by the line pulse. The transition position information of the reference line necessary for encoding is read out from one memory. The transition position information of the encoding line is written into the other memory. In this manner, the transition position information is written into the memories 7a and 7b instead of the binary image data. Therefore, the step of detecting the change points from the binary image data is unnecessary and the processing period of time can be reduced. In addition, there is no need to use memories of large capacities as the memories 7a and 7b, so that the overall circuit scale can be reduced.

Figure 7:
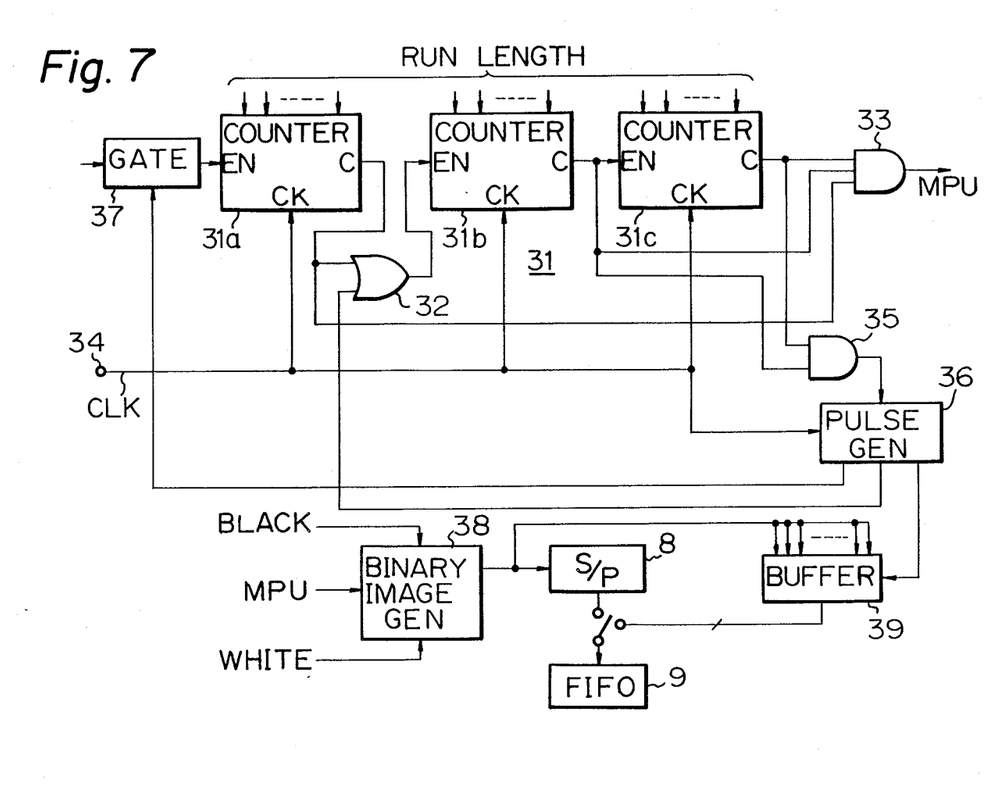
FIG. 7 is a block diagram showing a decoding circuit in an embodiment of the image signal processing apparatus according to the invention.

In the decoding circuit 11, the signal generating circuit to generate the binary image signal on the basis of the run length is constructed as shown in FIG. 7.

In FIG. 7, four-bit down-counters 31a, 31b, and 31c are cascade connected to constitute a 12-bit counter 31. A carry signal is outputted from each of the down-counters 31a, 31b, and 31c when the count value becomes 0.

Namely, the carry output of the counter 31a is supplied as a count enable signal to the counter 31b through an OR gate 32. The carry output of the counter 31b is supplied as a count enable signal to the counter 31c. The carry outputs of the counters 31a, 31b, and 31c are also supplied to an AND gate 33.

Subsequently, the value of the run length is set to the 12-bit counter 31. This value is decreased by the clock which is supplied to a terminal 34. When the count values of the counters 31a, 31b, and 31c become 0, a high level signal is generated from the AND gate 33 and sent to the MPU 6, so that the generation of the binary signal is controlled.

The carry outputs of the counters 31b and 31c are also supplied to an AND gate 35. A check is made to see if the count value of the counter 31 is above 16 or not by the AND gate 35. In other words, when the count value of the counter 31 becomes 15 or less, the count values of the counters 31b and 31c become 0 and the carry outputs are generated from the counters 31b and 31c, so that a high level signal is generated from the AND gate 35. In this way, it is possible to detect whether the value of the run length set in the counter is 16 or more.

The output of the AND gate 35 is supplied to a pulse generating circuit 36. When the value of the counter 31 is 16 or more, a pulse output is generated from the pulse generating circuit 36. This pulse output is supplied as a count enable signal to the counter 31b through the OR gate 32. At the same time, the output of the pulse generating circuit 36 is supplied to a gate circuit 37, so that the count enable signal of the counter 31a is interrupted.

Therefore, when the value of the run length set in the counter 31 is 16 or more, the counter 31b becomes the count enable state and the counting operation of the counter 31a is stopped. Thus, while the value of the counter is 16 or more, the counter 31b is counted down for every clock pulse which is supplied from the terminal 34. The value of the 12-bit counter 31 is reduced by sixteen at a time in response to each clock. When the value of the counter 31 becomes 15 or less, the gate circuit 37 is opened by the output of the pulse generating circuit 36 and the counter 31a becomes the count enable state. The counter 31a is counted down in response to each clock which is supplied from the terminal 34 and the value of the counter 31 is reduced one by one.

The binary image signal is generated from a binary image signal generating circuit 38 in response to a command from the MPU 6. An output of the generating circuit 38 is supplied to the S/P converting circuit 8 and a buffer circuit 39 for every clock pulse. The binary image signal of which all sixteen bits are white or black is formed by the buffer circuit 39.

When the value set to the counter is 16 or more, the output of the pulse generating circuit 36 is supplied to the buffer circuit 39 and the binary image signal of which all sixteen bits are white or black is supplied to the FIFO 9. Namely, the binary image signal of sixteen pixels is supplied to the FIFO 9 by one clock pulse. When the value set to the counter is 15 or less, the 16-bit output which has been converted into the parallel data by the S/P converter 8 is supplied to the FIFO 9.

According to the above construction then, when the run length set to the counter is, e.g., 16 or more, the binary image signal of, e.g., sixteen pixels is outputted by one clock, so that the processing time for decoding can be reduced.

Although the present invention has been shown and described with respect to preferred embodiments, various changes and modifications which are obvious to a person skilled in the art to which the invention pertains are deemed to lie within the spirit and scope of the invention.

What is claimed is:

1. An apparatus for processing an image signal comprising:
   data input circuit means for receiving input image data having first and second binary values;
   encoding circuit means for encoding said input image data into compressed code data; and
   data output circuit means for outputting said compressed code data,
   wherein said encoding circuit means includes
   (i) first detecting circuit means for detecting transition points where the value of said input image data changes from one to another of said first and second binary values,
   (ii) counter means for generating addresses of said transition points of said input image data,
   (iii) second detecting circuit means for detecting if the value of said input image data does not change during a time period exceeding a predetermined period,
   (iv) control means for controlling said counter means so as to count at a faster than normal speed until a predetermined number is reached during each predetermined period when the value of the input image data does not change during a period exceeding the predetermined period, and
   (v) encoder means for encoding said input image data by using said addresses of said transition points of said input image data.

2. An apparatus for processing an image signal comprising:
   data input circuit means for receiving compressed code data;
   decoding circuit means for decoding said input compressed code data into output image data to be outputted; and
   data output circuit means for outputting output image data,
   wherein said decoding circuit means includes
   (i) counter means for presetting a run length of said input compressed code data,
   (ii) detecting circuit means for detecting if the run length of said input compressed code data exceeds a predetermined number,
   (iii) control means for controlling said counter means so as to count at a faster than normal speed when the run length of said input compressed code data exceeds a predetermined number, and
   (iv) decoder means for generating binary image data according to said run length preset in said counter means.

3. Apparatus for processing lines of image data comprising:
   a data input/output circuit for receiving and outputting binary image data and compressed code data;
   an encoding circuit including (i) a first detecting circuit for detecting transition points where the value of an input binary image data changes from one to another, (ii) an up-counter for generating addresses of the transition points, (iii) a second detecting circuit for detecting if the value of the input binary image data does not change during a predetermined period so as to control the up-counter so as to count up faster than at a normal speed and (iv) means for encoding the input image data into the output compressed code data by using the correlation between a preceding line, used as a reference line, and a subsequent, encoding line based on the addresses of the transition points,
   a decoding circuit including a down-counter for presetting a run length of the input compressed code data and a third detecting circuit for detecting if the run length of the input compressed code data exceeds a predetermined number, means for controlling the down-counter so as to count down faster than at a normal speed, whereby the input compressed code data is decoded into the output binary image data,
   a pair of data memories for storing the addresses of the transition points of selected lines of image data;
   control circuit means for causing one of the data memories to be in a write status while the other is in a read status and for alternately changing the write and read statuses for every line to read out or write the addresses of the transition points of a preceding line from or into one of the data memories and the addresses of the transition points of an encoding or decoding line from or into the other memory,
   a microprocessor, including program memories, for selectively causing the encoding and decoding means to operate so that the data input/output circuit selectively receives or outputs binary image data and the compressed code data.

4. A method for processing an image signal comprising the steps of:
   receiving input image data having first and second binary values;
   encoding said input image data into compressed code data;
   outputting said compressed code data,
   wherein the encoding step includes
   (i) detecting transition points where the value of said input image data changes from one to another of said first and second binary values,
   (ii) generating addresses of said transition points of said input image data by advancing the count in a counter,
   (iii) detecting if the value of said input image data does not change during a time period exceeding a predetermined period,
   (iv) advancing the count in the counter at a faster than normal speed until a predetermined number is reached during each predetermined period when the value of the input image data does not change during a period exceeding the predetermined period, and
   (v) encoding said input image data by using said addresses of said transition points of said input image data.

5. A method of processing an image signal comprising the steps of:
   receiving compressed code data;
   decoding said received compressed code data; and
   outputting output image data,
   wherein said decoding step includes
   (i) presetting a counter with a run length of said input compressed code data,
   (ii) detecting if the run length of said input compressed code data exceeds a predetermined number,
   (iii) controlling said counter means so as to count at a faster than normal speed when the run length of said input compressed code data exceeds a predetermined number, and
   (iv) generating binary image data according to said run length preset in said counter means.

* * * * *